Patented Apr. 3, 1934

1,953,839

UNITED STATES PATENT OFFICE 1,953,839

CRYSTALLIZATION OF SODIUM METASILICATE HYDRATES

Myron C. Waddell, Lakewood, Ohio, assignor to The Grasselli Chemical Company, Cleveland, Ohio, a corporation of Delaware No Drawing. Application October 25, 1932, Serial No. 639,532

2 Claims. (Cl. 23—110)

The present invention relates to methods of crystallizing sodium metasilicate hydrates from sodium silicate solutions containing excess caustic soda and comprises correlating the amount of free caustic alkali contained in the sodium silicate solution and the crystallization temperature to produce hydrated products in the form of relatively large individual crystals with a maximum yield and a predetermined composition; and the present invention is particularly adapted to produce a pentahydrate of the formula $Na_2SiO_3.5 H_2O$. The common procedure of making hydrated sodium metasilicates has heretofore been to prepare at elevated temperatures a melt of the desired composition and concentration and to cool this melt preferably on a graining table where the product then solidifies.

I have found that in the presence of an excess of free caustic in the liquor, i. e. more than corresponds to the formula $Na_2SiO_3$, a concentrated liquor of sodium metasilicate, on cooling, precipitates crystals containing from 5 to 6 mols of water of crystallization; and I have found that in maintaining the conditions relating to the composition of said liquor and the temperature within certain limits, a yield of well developed crystals of uniform composition is obtained.

In cooling saturated or concentrated aqueous solutions of sodium metasilicate from about 60–75° C. down to about 25–30° C., the amounts of excess caustic required to produce crystallization of a hydrate with from 5 to 6 mols of water of crystallization ranges from about 20 or 25 to 35 grams of sodium hydroxide to 100 cc. of solution, and as a rule less excess of caustic is required to produce a hydrate of predetermined composition when crystallizing at higher temperatures and more caustic is required when crystallizing at lower temperatures within said ranges of excess and temperatures.

By more closely adjusting the relations between excess caustic and crystallizing temperature within said ranges, it is possible to produce at will a product corresponding in composition substantially to the penta or to the hexa hydrate.

While there is a lower limit of excess caustic for each temperature, the upper limit does not materially vary with the temperature; when using excesses greatly over 35 grams of NaOH per 100 cc. I found, however, that a novel sodium silicate of a different $Na_2O:SiO_2$ ratio is formed. This novel product and the methods of making it are disclosed and claimed in my co-pending application Serial Number 639,534 filed of even date herewith. On the other hand, when using considerably less than 25 grams excess caustic per 100 cc. of saturated metasilicate solution, other hydrates thereof crystallize out with the pentahydrate and products of indefinite composition are obtained.

When attempting to crystallize metasilicates above about 60° C. and at a lower caustic excess than about 20 or 25 grams per 100 cc. and a corresponding higher concentration of metasilicate, the manipulations for the production of good crystals become rather difficult.

This is probably due to a combination of facts. For one thing, a low causticity does not induce crystallization as readily as a higher causticity. This often results in super-cooling with lower causticity. A second point is that higher concentrations of metasilicate are required to induce any crystallization at all at low causticity and higher temperatures. This means that once crystallization has been induced, the causticity of the mother liquor increases relatively more rapidly than at lower concentrations of metasilicate and higher concentrations of caustic. This increase in causticity causes an acceleration of the crystallization rate which makes the production of good crystals more difficult than in the case where rate of growth is more deeply dependent on rate of cooling alone. In other words, crystallization at higher temperatures and low excess alkali is undesirable, as the crystals obtained are very small and are embedded in a viscous matrix from which they can only be separated with difficulty.

In using large excesses of caustic and attempting to crystallize at still lower temperatures, it was found that the metasilicate tenaciously retains, probably in chemical combination, certain amounts of the free alkali, and the products obtained do not correspond any more to the composition $Na_2SiO_3.5H_2O$.

The most practical conditions for obtaining a substantial yield of well developed sodium metasilicate pentahydrate crystals will be found within the range of crystallization temperatures of +25° to +60° C. and with a caustic soda excess corresponding to between 20 or 25 to 35 grams of NaOH per 100 cc. of a concentrated sodium metasilicate solution at a temperature of about 60–75° C.

Such a solution contains, for instance from 35 to 40% by weight of $Na_2SiO_3.5H_2O$, a solution of 37% having for instance a specific gravity of 47° Bé. Within the operative range of crystallization temperatures of about +25 to +60° C. the minimum amounts of excess caustic required to produce a substantially pentahydrated sodium metasilicate increase by about 2 grams NaOH per 100 cc. for each drop of 5° C. in the crystallization temperature.

The addition of substantial amounts of caustic alkali to metasilicate solutions does not materially affect the latter's solubility within the ranges of concentrations and temperatures contemplated in my process.

It was, for instance, found that the mother liquors at 30° C. from crystallizations of metasilicate pentahydrate and from solutions containing originally various amounts of free NaOH were as follows:

| Original solution contained grams NaOH per 100 cc. | Mother liquor contained grams pentahydrate per 100 cc. at 30° C. |
|---|---|
| 25 | 9.6 |
| 30 | 9.7 |
| 35 | 9.5 |

The following table shows the effect of causticity and crystallizing temperature on the water of crystallization of the crop of crystals obtained. It is noted in this respect that the pentahydrate contains 42.45% $H_2O$ and the hexahydrate 46.96% $H_2O$.

| NaOH per 100 cc. | Water of crystallization in crop at temperatures of | | | |
|---|---|---|---|---|
| | 30° C. | 35° C. | 40° C. | 50° C. |
| 0 | 57 | | | 48.7 |
| 10 | | | | 47.5 |
| 20 | | | 45.3 | |
| 25 | 47.5 | | 43.7 | 42.5 |
| 30 | 43.7 | 42.95 | 42.9 | |
| 35 | 43.25 | | | |

In the performance of my invention I have, for instance, prepared a hot, concentrated solution which contained 40% by weight of metasilicate figured as the pentahydrate and 21% by weight of NaOH, this latter corresponds to 30 grams per 100 cc. This solution was then allowed to cool gradually under agitation. This can be done in paddle agitated tanks or by passing through a continuous crystallizer, such as the well known Swenson-Walker or any other suitable crystallizing apparatus. Cooled to 30° C., the above solution delivered about 3⅓ lbs. of crystals per gal. After freeing the crystals from occluded mother liquor, the product analyzed 29.3% $Na_2O$, 27.8% $SiO_2$ and 42.9% $H_2O$ which corresponds substantially to the formula $Na_2SiO_3.5H_2O$.

The mother liquor, from such an operation is saturated with metasilicate and contains the excess free alkali; it is conveniently used as the solvent for additional crystallizations of the pentahydrate.

The crude crystals of metasilicate hydrate obtained as above are contaminated with substantial amounts of caustic liquor adhering thereto, which makes it difficult to produce a dry product.

I have found that such crystals can be freed of such mother liquor, or purified, by washing them with certain organic solvents, such as aqueous, water soluble alcohols which do not dissolve the metasilicate but in which caustic alkali is easily soluble. I have disclosed and claimed such a washing process in my co-pending application, Ser. #639,533 filed on even date herewith.

It is also possible to free these crystals from contaminating mother liquor by washing them with a sodium silicate solution containing more silicate than that corresponding to the ratio 1:1. This process is disclosed and claimed in an application by the inventor L. R. Westbrook, filed on even date herewith and having the Ser. #639,531.

I claim:

1. In a process of preparing a hydrated crystalline sodium metasilicate, the steps which comprise preparing a hot, concentrated solution of sodium metasilicate containing at least 25 grams of NaOH per 100 cc., cooling said solution to a temperature of between +25 to +55° C. and correlating the crystallization temperature to the free caustic in the solution so that for each 5° C. drop in the crystallization temperature below 55° C. there is at least an increase of two grams NaOH per 100 cc. of solution above 25 grams.

2. In a process of preparing a hydrated crystalline sodium metasilicate, the steps which comprise preparing a hot, concentrated solution of sodium metasilicate containing from about 25 to 35 grams of NaOH per 100 cc., cooling said solution to a temperature of between +25 to +55° C. and correlating the crystallization temperature to the free caustic in the solution so that for each 5° C. drop in the crystallization temperature below 55° C. there is at least an increase of 2 grams NaOH per 100 cc. of solution above 25 grams.

MYRON C. WADDELL.